Feb. 5, 1924.

H. F. SCRUBY ET AL 1,482,661

FLUID PRESSURE BRAKE

Filed Jan. 18, 1923   2 Sheets-Sheet 1

Inventor
HORACE F. SCRUBY
CHARLES B. ROGERS

By G. W. Earnshaw
Attorney

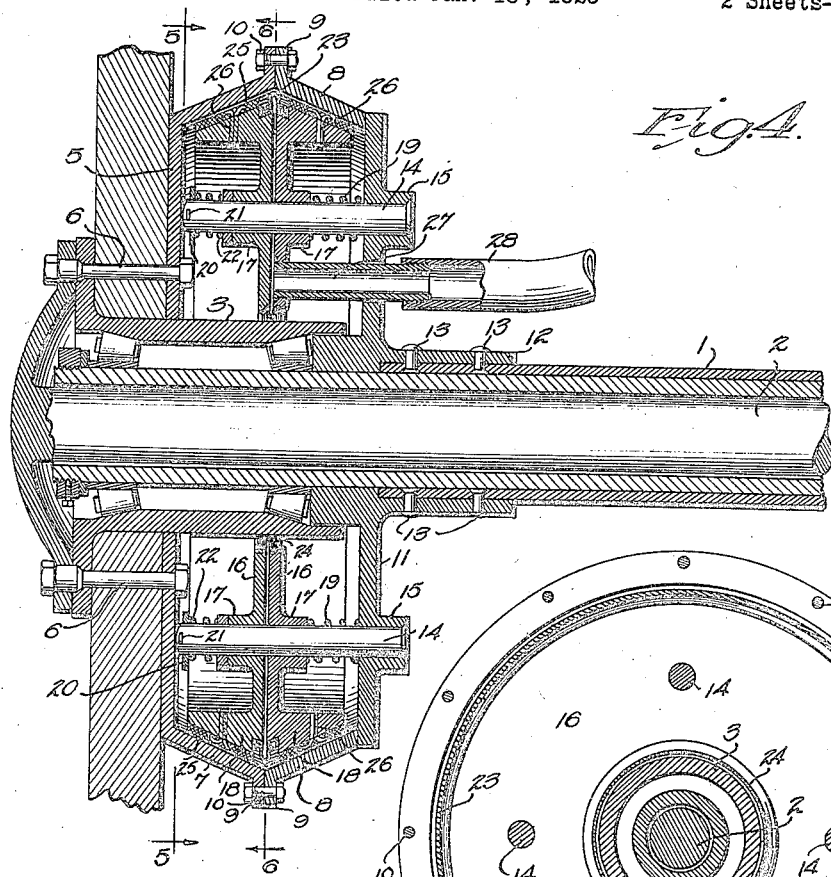
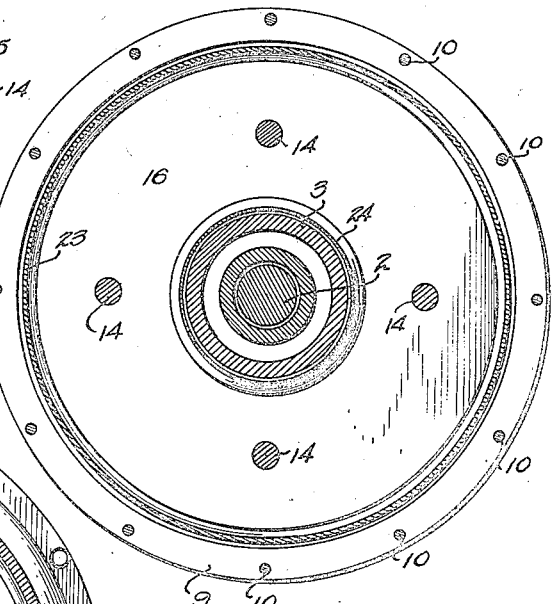
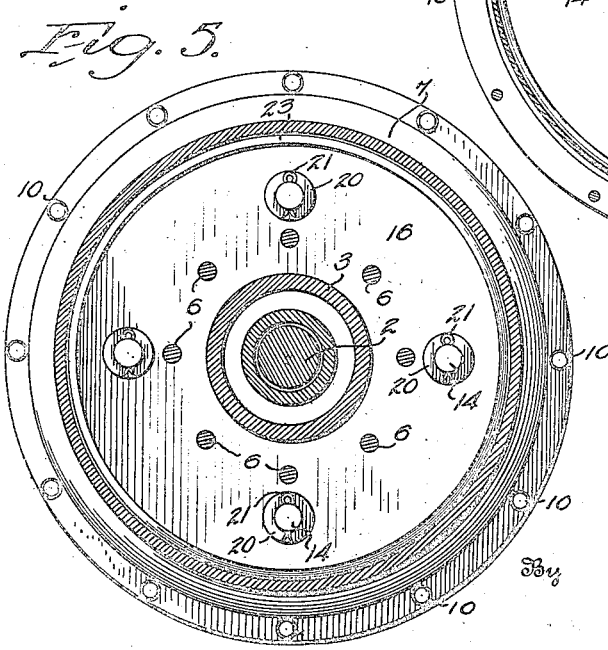

Patented Feb. 5, 1924.

1,482,661

UNITED STATES PATENT OFFICE.

HORACE F. SCRUBY, OF MIAMI, OKLAHOMA, AND CHARLES B. ROGERS, OF JOPLIN, MISSOURI.

FLUID-PRESSURE BRAKE.

Application filed January 18, 1923. Serial No. 613,498.

*To all whom it may concern:*

Be it known that we, HORACE F. SCRUBY and CHARLES B. ROGERS, citizens of the United States, residing at Miami, in the county of Ottawa and State of Oklahoma, and Joplin, in the county of Jasper and State of Missouri, respectively, have invented certain new and useful Improvements in Fluid-Pressure Brakes, of which the following is a specification.

This invention relates to fluid pressure brakes, and more particularly to fluid pressure brakes for motor vehicles.

An object of the invention is the provision of a brake structure requiring a slight air pressure to operate it.

A further object of the invention is the provision of a brake in which the brake shoes will be applied with equal pressure at all points.

A further object of the invention is the provision of a brake that is simple in construction and very unlikely to get out of order.

Figure 1:
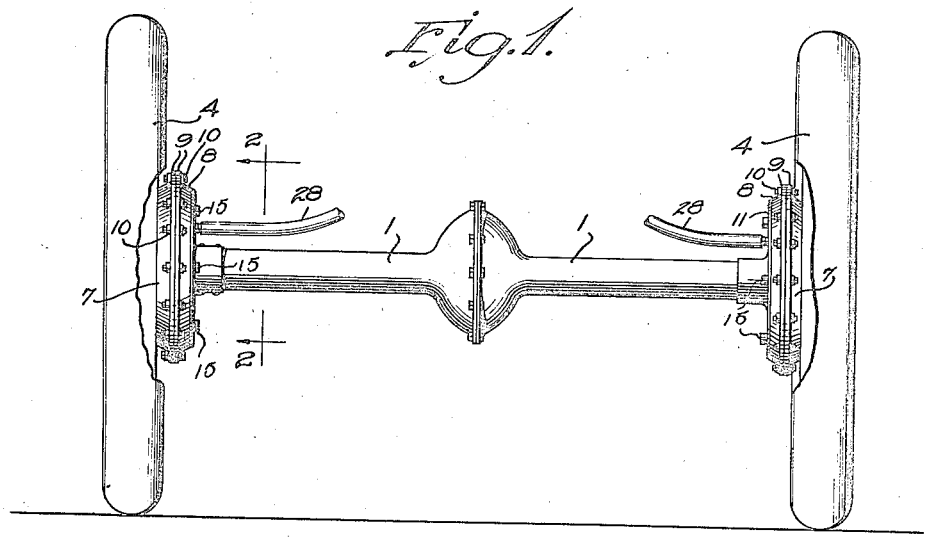
Figure 2:
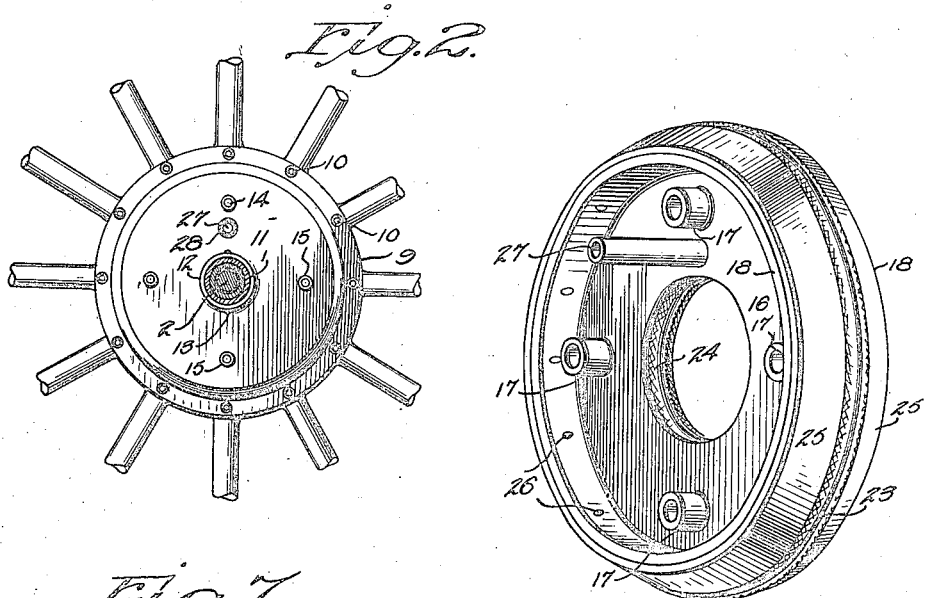
Figure 3:
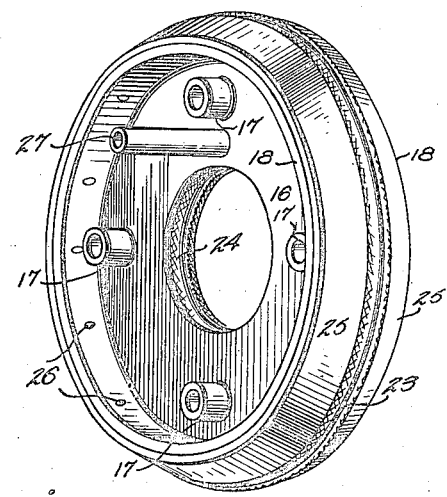
Figure 7:
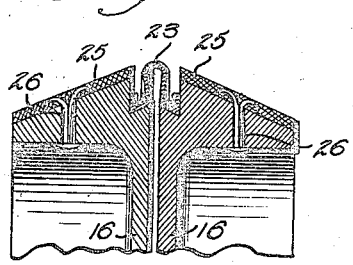

In the accompanying drawings, we have shown one embodiment of the invention. In this showing:

Figure 1 is an elevation of the rear axle and wheels of the motor vehicle showing the invention applied, Figure 2 is a detail sectional view on line 2—2 of Figure 1, Figure 3 is a perspective view of the brake shoes removed, Figure 4 is a vertical sectional view of the brake, Figure 5 is a detail sectional view on line 5—5 of Figure 4, looking in the direction of the arrow, Figure 6 is a similar view on line 6—6 of Figure 4, and, Figure 7 is a detail sectional view of a portion of the brake shoes.

Referring to the drawings, the reference numeral 1 designates generally the rear axle housing of a motor vehicle. A live axle 2 is mounted in this housing in the usual manner and is secured to the hubs 3 of the wheels 4.

The brake forming the subject matter of the present invention consists of a brake drum carried by the wheel in the usual manner. The brake drum is formed in two sections. The outer section consists of a disk 5 which is secured to the hub of the wheel by means of bolts 6. This disk is provided with a flange 7 arranged at an angle thereto. The other section of the drum consists of a ring 8 arranged at an angle corresponding to the angle of the flange 7. The flange 7 and the ring 8 are provided with flanges 9 at their adjacent edges which are adapted to receive bolts 10, by means of which the ring is retained in position.

The brake shoes are supported on a stationary disk 11 which is secured to the axle housing. As shown, this disk is provided with a centrally arranged sleeve 12 fitting over the housing and is secured to the housing by means of bolts or rivets 13. A plurality of pins 14 are supported by this disk, the pins being arranged in bosses 15. These pins are arranged concentrically of the axle, as shown in Figures 5 and 6. The brake shoes are supported on these pins, as shown, and are free to move laterally within the brake drum. As shown, the brake shoes consist of disks 16 having a plurality of concentric openings surrounded by bearing portions 17 which are adapted to receive the pins 14. The outer edges of the disks 16 are provided with flanges 18 arranged parallel to the flange 7 and the ring 8. The pins 14 are surrounded by coil springs 19 between the adjacent disk and the plate 11 adapted to force the adjacent disk toward the center of the brake housing. A washer 20 is arranged on the end of the pin, being retained in position by means of a cotter pin 21. The coil spring 22 is arranged between this washer and the adjacent disk and is adapted to force the disk toward the opposite disk. The space between the disks is closed at the outer edge by means of a flexible member 23, which is secured to the disks in any suitable manner. The space between the disks at the center is similarly closed by a flexible member 24. The flanges 18 which form the brake shoes proper are provided with facings 25 of suitable frictional material which are secured to the brake shoes by means of rivets 26 or other suitable means.

The space between the disks is connected to a source of pressure by means of a pipe 27 which passes through one of the disks as shown in Figure 4. The end of this pipe is connected to a conduit 28, leading to a storage tank (not shown).

The operation of the brake will be apparent from the foregoing description. The brake shoes are normally retained in spaced position from the brake housing by means of the springs 19 and 22. The pressure of the springs forces the disks 16 toward the center of the brake housing and brings the braking surfaces 25 out of engagement with the inner face of the brake drum. The brake drum revolves with the wheel and the brake shoes are stationary, being supported from the axle housing. When the operator of the vehicle desires to apply the brakes, air or other fluid is admitted to the space between the disks through the pipe 27 and conduit 28. This forces the disks apart against the pressure of the springs 19 and 22. As the disks are forced apart, the flanges 18, or brake shoes, are moved toward the inner faces of the flange 7 and ring 8 which form the brake drum. The frictional facings 25 engage these surfaces and thus retard the revolution of the wheel or effect a braking action.

It will be noted that the brake shoes engage the brake drum with equal pressure throughout its entire circumference, thus giving a perfect braking action. It will be further noted that the brake shoes are positively moved out of contact with the brake drum when the pressure is released by the springs 19 and 22, thus preventing either of the brake shoes from remaining in contact with the surface of the brake drum and dragging.

It is to be understood that the form of the invention herewith shown and described is to be taken as a preferred example of the same, and that various changes in the shape, size, and arrangement of parts may be resorted to without departing from the spirit of the invention or the scope of subjoined claims.

Having thus described my invention, I claim:

1. In a fluid pressure brake, a brake drum adapted to be secured to a revolving member, a supporting plate arranged adjacent said drum and secured to a stationary member, a plurality of pins carried by said plate and projecting into said drum, laterally movable disks mounted on said pins, flexible members secured to said disks to form a chamber between them, means for admitting fluid to said chamber, and friction surfaces carried by said disks and adapted to engage said brake drum when said disks are moved away from each other.

2. In a fluid pressure brake, a brake drum secured to a revolving member, a supporting plate arranged adjacent said drum and secured to a stationary member, pins carried by said plate and arranged within said drum, a pair of disks mounted on said pins and capable of lateral movement, springs surrounding said pins and adapted to normally retain said disks adjacent each other, flexible members secured to said disks to form a chamber between them, means for delivering fluid to said chamber, and friction surfaces carried by said disks and adapted to engage the inner surface of said drum when the disks are spaced.

3. A brake for motor vehicles, comprising a disk adapted to be secured to the wheel of a motor vehicle, said disk being provided with an inclined peripheral flange, a ring adapted to be secured thereto and inclined in the opposite direction, a supporting plate adapted to be secured to the axle housing and arranged adjacent the edge of said ring, pins mounted on said plate and extending into the flange and ring, a pair of disks mounted on said pins, said disks being provided with flanges parallel to said flange and ring, and normally spaced therefrom, friction surfaces formed on said flanges, and means for delivering fluid to the space between said disks to spread said disks and cause said friction surfaces to engage the inner faces of said flange and said ring.

4. A device constructed in accordance with claim 3 wherein said disks are normally retained adjacent each other by springs mounted on said pins.

In testimony whereof, we affix our signatures in presence of a witness.

HORACE F. SCRUBY.
CHARLES B. ROGERS.

Witness:
CLARENCE CRAIG.